United States Patent
Webber

(10) Patent No.: US 6,218,054 B1
(45) Date of Patent: *Apr. 17, 2001

(54) DIOXOLANE AND DIMETHOXYETHANE ELECTROLYTE SOLVENT SYSTEM

(75) Inventor: Andrew Webber, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/373,605

(22) Filed: Jan. 17, 1995

Related U.S. Application Data

(63) Continuation-in-part of application No. 07/744,179, filed on Aug. 13, 1991, now abandoned.

(51) Int. Cl.[7] .................................................. H01M 10/40
(52) U.S. Cl. ............................................. 429/335; 429/324
(58) Field of Search .................................. 429/197, 335, 429/324

(56) References Cited

U.S. PATENT DOCUMENTS

| | | |
|---|---|---|
| H578 | 2/1989 | Behl et al. . |
| H829 | 10/1990 | Behl . |
| 744,179 | 8/1903 | Webber . |
| 3,423,242 | 1/1969 | Meyers et al. . |
| 3,607,413 | 9/1971 | Buzzelli . |
| 3,762,954 | 10/1973 | Metcalfe, III et al. . |
| 3,778,310 | 12/1973 | Garth . |
| 3,796,604 | 3/1974 | Gabano et al. . |
| 3,811,947 | 5/1974 | Metcalfe, III et al. . |
| 3,947,289 | 3/1976 | Dey et al. . |
| 3,957,532 | 5/1976 | Settle et al. . |
| 3,959,012 | 5/1976 | Liang et al. . |
| 3,996,069 | 12/1976 | Kronenberg . |
| 4,071,665 | 1/1978 | Garth . |
| 4,129,691 | 12/1978 | Broussely . |
| 4,228,224 | 10/1980 | Heredy et al. . |
| 4,228,227 | 10/1980 | Saathoff et al. . |
| 4,275,129 | 6/1981 | Kappus et al. . |
| 4,284,692 | 8/1981 | Rao et al. . |
| 4,335,191 | 6/1982 | Peled . |
| 4,416,960 | 11/1983 | Eustace et al. . |
| 4,436,796 | 3/1984 | Huggins et al. . |
| 4,450,214 | 5/1984 | Davis . |
| 4,482,613 | 11/1984 | Turchan et al. . |
| 4,489,143 | 12/1984 | Gilbert et al. . |
| 4,489,144 | 12/1984 | Clark . |
| 4,532,195 | 7/1985 | Weddigen . |
| 4,540,642 | 9/1985 | Kaun . |
| 4,717,634 | 1/1988 | Daifuku et al. . |
| 4,728,590 | 3/1988 | Redey . |
| 4,803,137 | 2/1989 | Miyazaki et al. . |
| 4,808,499 | 2/1989 | Nagai et al. . |
| 4,814,242 | 3/1989 | Maxfield et al. . |
| 4,849,309 | 7/1989 | Redey et al. . |
| 4,861,573 | 8/1989 | deNeufville et al. . |
| 4,952,330 | 8/1990 | Leger et al. . |
| 4,956,247 | 9/1990 | Miyazaki et al. . |
| 5,229,227 | 7/1993 | Webber . |

FOREIGN PATENT DOCUMENTS

| | | |
|---|---|---|
| 1174274 | 9/1984 | (CA) . |
| 0049082 | 4/1982 | (EP) . |
| 2252658 | 6/1975 | (FR) . |
| 1510642 | 5/1978 | (GB) . |
| 1583981 | 2/1981 | (GB) . |
| 2087132 | 5/1982 | (GB) . |

(List continued on next page.)

*Primary Examiner*—John S. Maples
(74) *Attorney, Agent, or Firm*—Russell H. Toye, Jr.; Robert W. Welsh

(57) ABSTRACT

An electrolyte solvent system for use in electrochemical cells in which the electrolyte solvent system consists essentially of a dioxolane-based solvent and a dimethoxyethane-based solvent in a weight ratio of about 1:3. Also disclosed are electrolyte solutions and electrochemical cells comprising such a solvent system.

24 Claims, 1 Drawing Sheet

FOREIGN PATENT DOCUMENTS

| | | |
|---|---|---|
| 5,290,414 * | 3/1994 | Marple .................... 429/197 X |
| 2157065 | 10/1985 | (GB) . |
| 48-33811 | 10/1973 | (JP) . |
| 56-38774 | 4/1981 | (JP) . |
| 57-50772 | 3/1982 | (JP) . |
| 59-173961 | 10/1984 | (JP) . |
| 59-173977 | 10/1984 | (JP) . |
| 63-102163 | 5/1988 | (JP) . |
| 63-226881 | 9/1988 | (JP) . |
| 63-257183 | 10/1988 | (JP) . |
| 89-134873 | 5/1989 | (JP) . |
| 1-232661 | 9/1989 | (JP) . |
| 2-284361 | 11/1990 | (JP) . |
| 3-37969 | 2/1991 | (JP) . |
| 4-284361 | 10/1992 | (JP) . |
| WO92/13366 | 8/1992 | (WO) . |

* cited by examiner

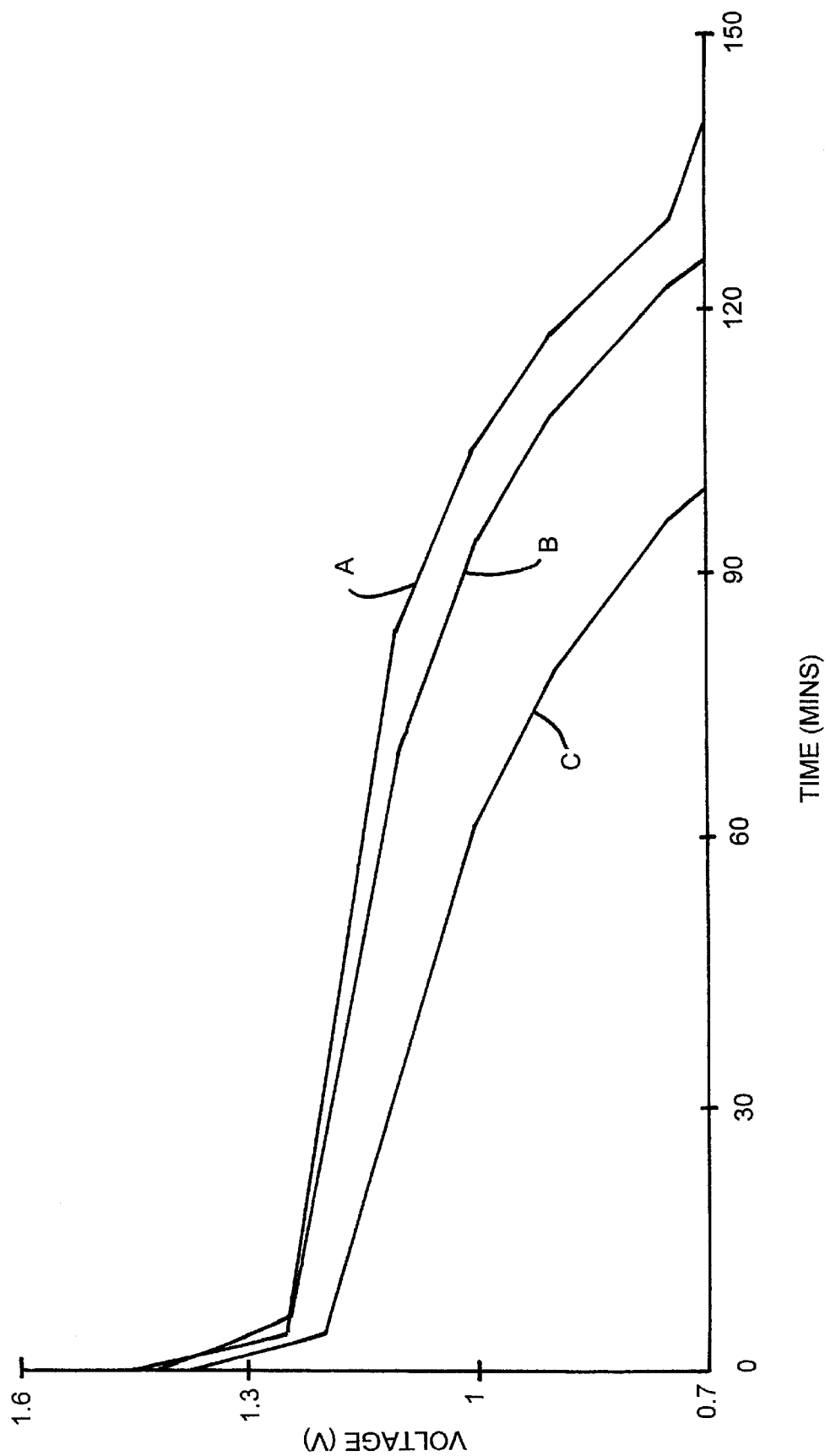

DIOXOLANE AND DIMETHOXYETHANE ELECTROLYTE SOLVENT SYSTEM

This is a continuation-in-part application of application Ser. No. 07/744,179 filed on Aug. 13, 1991, now abandoned, entitled NONAQUEOUS ELECTROLYTES, which is herein incorporated by reference.

FIELD OF THE INVENTION

The present invention relates to an electrolyte solvent system for use in electrochemical cells consisting essentially of a dioxolane-based solvent and a dimethoxyethane-based solvent in a ratio of about 1:3, respectively. The invention also relates to electrolyte solutions comprising one or more solutes dissolved in such a system, and cells utilizing such a system.

BACKGROUND OF THE INVENTION

In the parent application, Ser. No. 07/744,179, the present inventor disclosed and claimed a class of nonaqueous electrolyte solvent systems. It has since been discovered that if only two of such solvents are used, namely dioxolane and dimethoxyethane, and in particular proportions, this provides significant advantages that are surprising and unexpected.

Electrolytes comprising dioxolane and dimethoxyethane are known in the art, however prior artisans have not disclosed, or even suggested an electrolyte solvent system consisting essentially of a dioxolane-based solvent and a dimethoxyethane-based solvent in the particular proportions taught herein. U.S. Pat. No. 4,071,665 to Garth discloses a two component electrolyte solvent system containing dioxolane and dimethoxyethane in a ratio of 1 part dioxolane to 0 to 1 part dimethoxyethane such as at column 3, lines 9–10 and Example 6. However, Garth fails to describe or suggest an electrolyte solvent system containing dioxolane and dimethoxyethane in the novel ratios disclosed and claimed herein. U.S. Pat. No. 4,129,691 to Broussely describes electrolytes comprising two and three solvent components. Although Broussely describes an electrolyte having one part dioxolane to three parts dimethoxyethane as part of a solvent complex, such as at column 5, line 20, it is a three component solvent system and not a two component solvent system as in the present invention. Broussely also describes a two component solvent system of dioxolane and dimethoxyethane, such as at column 3, lines 39–40, however those solvents are in equal proportions to one another and not in the novel ratios disclosed and claimed herein. U.S. Pat. No. 4,489,144 to Clark discloses an electrolyte solution containing dioxolane and dimethoxyethane. However, that three component electrolyte utilizes a significantly greater amount of dioxolane than dimethoxyethane, such as in a ratio of one and one third to one, respectively, as noted at column 9, line 19.

Numerous applications for electrochemical cells require that the cell be capable of providing a current output of at least some minimal value over an extended period of time, referred to herein as its "discharge period". This is particularly desirable for applications involving portable consumer electronic products. Moreover, many applications for electrochemical cells require that the cell be capable of providing a current output with minimal reduction in voltage level, that is, that the cell output voltage have a minimal decay rate over the course of the cell discharge period. This is particularly desirable in high current drain applications such as camera flash applications. Prior artisans, including Garth, Broussely, and Clark, have entirely failed to recognize these and other advantages resulting from an electrolyte solvent system consisting essentially of a dioxolane-based solvent and a dimethoxyethane-based solvent in the ratios taught herein.

Currently known electrolytes containing dioxolane and dimethoxyethane have discharge periods of only moderate duration and relatively rapid voltage decay rates. It is desirable to provide a cell that has a significantly longer discharge period, and a voltage output that is relatively constant and not subject to such relatively rapid voltage decay.

SUMMARY OF THE INVENTION

The present invention provides an electrolyte solvent system consisting essentially of a dioxolane-based solvent and a dimethoxyethane-based solvent in a ratio of about 1:3, respectively. A solute is dissolved in this electrolyte solvent system. The present invention also provides electrochemical cells comprising such an electrolyte solvent system.

BRIEF DESCRIPTION OF THE DRAWING

The FIGURE is a graph illustrating comparative testing performed between the preferred two component electrolyte solvent system of the present invention versus two other electrolyte solvent systems utilizing the same components, however in ratios outside the scope of the present invention.

DESCRIPTION OF THE PREFERRED EMBODIMENTS

The Electrolyte Solvent System

The preferred embodiment electrolyte solvent system consists essentially of a dioxolane-based solvent and a dimethoxyethane-based solvent in a weight ratio of about 1:3, respectively. In a most preferred embodiment, the solvent system consists solely of dioxolane-based solvent and a dimethoxyethane-based solvent in a weight ratio of about 1:3, respectively.

As used herein the term dioxolane-based solvent refers to dioxolane (DIOX), alkyl-substituted dioxolanes, or mixtures thereof. Examples of alkyl-substituted dioxolanes include but are not limited to 4-methyl-1,3-dioxolane, 2,2-dimethyl-1,3-dioxolane, or derivatives thereof. The preferred dioxolane-based solvent for use in the preferred embodiment electrolyte solvent system is 1,3-dioxolane.

As used herein the term dimethoxyethane-based solvent refers to dimethoxyethane (DME) or its derivatives such as, but not limited to 1,1-dimethoxyethane, 1,2-dimethoxyethane, ethylglyme, diglyme, and triglyme (glyme is an abbreviation for glycol dimethyl ether). The preferred dimethoxyethane-based solvent for use in the preferred embodiment electrolyte solvent system is 1,2-dimethoxyethane.

It has been discovered that significantly superior performance in the nature of longer discharge periods and reduced decay in voltage output, is achieved in electrochemical cells utilizing an electrolyte solvent system consisting essentially of a dioxolane-based solvent and a dimethoxyethane-based solvent in a weight ratio of about 1:3 to one another.

The Electrochemical Cell

The components of the preferred embodiment electrochemical cell utilizing the electrolyte solvent system are as follows.

Highly active metal anodes suitable for cells employing the subject electrolyte solvent system include lithium (Li), sodium (Na), potassium (K), calcium (Ca), magnesium (Mg) and their alloys and metal-intercalated carbon or graphite material such as lithiated carbon. Of these active metals, lithium is generally preferred because, in addition to being a ductile, soft metal that can easily be assembled in a cell, it possesses the highest energy-to-weight ratio of the group of suitable anode metals.

Cathodes for use in cells utilizing the subject electrolyte solvent system are solid electrodes which include fluorinated carbon represented by the formula $(CF_x)_n$ wherein x varies between about 0.5 and about 1.2 and $(C_2F)_n$ wherein in both cathodes the n refers to the number of monomer units which can vary widely, copper sulfide (CuS), copper oxide (CuO), lead dioxide ($PbO_2$), iron sulfides (FeS, $FeS_2$), copper chloride ($CuCl_2$), silver chloride (AgCl), sulfur (S), bismuth trioxide ($Bi_2O_3$), copper bismuth oxide ($CuBi_2O_4$), cobalt oxides, lithiated cobalt oxides such as $LiCoO_2$, manganese oxides such as $MnO_2$, lithiated manganese oxides such as $LiMn_2O_4$, vanadium pentoxide ($V_2O_5$), tungsten trioxide ($WO_3$), molybdenum trioxide ($MoO_3$), molybdenum disulfide ($MOS_2$), titanium disulfide ($TiS_2$), transition metal polysulfides and the like. For the higher voltage cathodes such as $MnO_2$, the use of the alkyl-substituted dioxolanes is preferred for better stability.

The preferred cathodes are the iron sulfides alone and in combination with other cathode materials such as:

$FeS_2+CuO$
$FeS_2+Bi_2O_3$
$FeS_2+Pb_2Bi_2O_5$
$FeS_2+Pb_3O_4$
$FeS_2+CuO+Bi_2O_3$
$FeS_2+CuO+Pb_3O_4$
$FeS_2+CuO+CoS_2$
$FeS_2+MnO_2$
$FeS_2+COS_2$

The ionizable solute for use with the preferred embodiment electrolyte solvent system and cells may be a simple salt such as $LiCF_3SO_3$ or lithium bistrifluoromethylsulfonyl imide ($Li(CF_3SO_2)_2N$) or a double salt or mixtures thereof which will produce an ionically conductive solution when dissolved in the preferred embodiment electrolyte solvent system described herein. Lithium iodide (LiI) is a useful simple salt for low voltage cathode systems such as iron sulfides, CuS, and CuO. Suitable solutes are complexes of inorganic or organic Lewis acids and inorganic ionizable salts. One of the requirements for utility is that the salts, whether simple or complex, be compatible with the solvent (s) being employed and that they yield a solution which is sufficiently ionically conductive, e.g., at least about $10^{-4}$ $ohm^{-1}$ $cm^{-1}$. Generally, an amount of at least about 0.5 M (moles/liter) would be sufficient for most cell applications.

Typical suitable Lewis acids include aluminum fluoride, aluminum bromide, aluminum chloride, antimony pentachloride, zirconium tetrachloride, phosphorus pentachloride, phosphorus pentafluoride, boron fluoride, boron chloride, boron bromide, and arsenic pentafluoride.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The ionizable solute for use in conjunction with iron sulfide-containing cathode would be lithium iodide (LiI), lithium trifluoromethanesulfonate ($LiCF_3SO_3$), lithium bis-trifluoromethylsulfonyl imide ($Li(CF_3SO_2)_2N$), lithium perchlorate ($LiClO_4$), lithium hexafluoroarsenate ($LiAsF_6$) or mixtures thereof. The most preferred solute is a combination of LiI and $LiCF_3SO_3$ in about a 1:1 molar ratio. This combination is preferred for the best combination of performance at high discharge rate and low temperature. Suitable double salts for various cell applications would be lithium tetrafluoroborate ($LiBF_4$), lithium hexafluorophosphate ($LiPF_6$) and potassium hexafluoroarsenate ($KAsF_6$).

EXAMPLES

Numerous AA electrochemical cells containing an electrolyte solvent system of 1,3-dioxolane and 1,2-dimethoxyethane in varying proportions were prepared as described below. Each cell utilized a lithium anode and $FeS_2$ cathode, and an electrolyte solution of 0.75 M lithium triflate (lithium trifluoromethanesulfonate) in the electrolyte solvent system of 1,3-dioxolane and 1,2-dimethoxyethane. Each lot of cells (average of 3 cells per lot) was tested by discharging the cells in a continuous fashion at a 1-ampere rate and measuring the discharge period and voltage at various times during discharge and thus the voltage decay profile of the cell during discharge. The Table presents the measurements of average cell voltages at various times during discharge. The last time value noted is the discharge period corresponding to a terminal discharge voltage of 0.75 V, for the particular cell and electrolyte solution combination.

TABLE

| 1:3 DIOX:DME (Line A in FIG.) | | 1:1 DIOX:DME (Line B in FIG.) | | 3:1 DIOX:DME (Line C in FIG.) | |
|---|---|---|---|---|---|
| TIME (minutes) | VOLTAGE (volts) | TIME (minutes) | VOLTAGE (volts) | TIME (minutes) | VOLTAGE (volts) |
| 0 | 1.46 | 0 | 1.44 | 0 | 1.39 |
| 3 | 1.30 | 4 | 1.30 | 2 | 1.30 |
| 4 | 1.25 | 6 | 1.25 | 3 | 1.25 |
| 29 | 1.20 | 25 | 1.20 | 4 | 1.20 |
| 83 | 1.10 | 69 | 1.10 | 33 | 1.10 |
| 104 | 1.00 | 93 | 1.00 | 61 | 1.00 |
| 117 | 0.90 | 108 | 0.90 | 78 | 0.90 |
| 129 | 0.75 | 122 | 0.75 | 96 | 0.75 |

The data presented in the Table is graphically illustrated in the FIGURE. Line A represents the voltage decay function of a cell utilizing an electrolyte solvent system of the preferred embodiment of the present invention, that is, a solvent system consisting essentially of 1,3-dioxolane and 1,2-dimethoxyethane in a weight ratio of about 1:3. Lines B and C represent voltage decay functions of cells utilizing electrolyte solvent systems also containing 1,3-dioxolane and 1,2-dimethoxyethane, however in ratios outside the scope of the present invention.

Line A illustrates the superior voltage decay function of a cell utilizing the electrolyte solvent system of the present invention as compared to cells utilizing solvent systems also composed of those two solvents, however in proportions outside the scope of the present invention, as illustrated by lines B and C. As the cells are discharged, the voltage of cells of the preferred embodiment provide a higher and more stable voltage output than cells corresponding to lines B and C. In addition, the cells of the preferred embodiment provide longer discharge periods, i.e., 129 minutes, than cells corresponding to lines B and C, i.e., 122 and 96 minutes.

Of course, it is understood that the foregoing are merely preferred embodiments of the invention and that various changes and alterations can be made without departing from the spirit and broader aspects thereof as set forth in the appended claims, which are to be interpreted in accordance with the principals of patent law including the Doctrine of Equivalents.

The embodiments of the invention in which an exclusive property or privilege is claimed are defined as follows:

1. An electrolyte solvent system for use in an electrochemical cell, said solvent system consisting essentially of:
    (a) a dioxolane-based solvent; and
    (b) a dimethoxyethane-based solvent;
    wherein the weight ratio of said dioxolane-based solvent to said dimethoxyethane-based solvent is about 1:3.

2. The solvent system of claim 1 wherein said dioxolane-based solvent is selected from the group consisting of 1,3-dioxolane, alkyl-substituted dioxolanes, and mixtures thereof.

3. The solvent system of claim 2 wherein said alkyl-substituted dioxolane is selected from the group consisting of 4-methyl-1,3-dioxolane, and 2,2-dimethyl-1,3-dioxolane.

4. The solvent system of claim 1 wherein said dioxolane-based solvent is 1,3-dioxolane.

5. The solvent system of claim 1 wherein said dimethoxyethane-based solvent is selected from the group consisting of 1,1-dimethoxyethane, 1,2-dimethoxyethane, ethylglyme, diglyme, triglyme, and combinations thereof.

6. The solvent system of claim 1 wherein said dimethoxyethane-based solvent is 1,2-dimethoxyethane.

7. An electrolyte solution for an electrochemical cell, said solution comprising:
    (a) a solute; and
    (b) an electrolyte solvent system consisting essentially of a dioxolane-based solvent and a dimethoxyethane-based solvent, wherein the weight ratio of said dioxolane-based solvent to said dimethoxyethane-based solvent is about 1:3.

8. The solution of claim 7 wherein said solute is selected from the group consisting of ionizable solutes and complexes of Lewis acids.

9. The solution of claim 7 wherein said dioxolane-based solvent is selected from the group consisting of 1,3-dioxolane, alkyl-substituted dioxolane, and mixtures thereof.

10. The solution of claim 7 wherein said dimethoxyethane-based solvent is selected from the group consisting of 1,1-dimethoxyethane, 1,2-dimethoxyethane, ethylglyme, diglyme, triglyme, and combinations thereof.

11. The solution of claim 7 wherein said solute comprises lithium iodide and lithium trifluoromethanesulfonate.

12. The solution of claim 11 wherein said lithium iodide and said lithium trifluoromethanesulfonate are in a molar ratio of about 1:1.

13. An electrochemical cell comprising:
    (a) an anode;
    (b) a cathode;
    (c) an electrolyte solvent system in association with said anode and said cathode; and
    (d) a solute dissolved in said electrolyte solvent system;
    wherein said electrolyte solvent system consists essentially of a dioxolane-based solvent and a dimethoxyethane-based solvent in a weight ratio of about 1:3, respectively.

14. The cell of claim 13 wherein said dioxolane-based solvent is selected from the group consisting of 1,3-dioxolane, alkyl-substituted dioxolanes, and mixtures thereof.

15. The cell of claim 14 wherein said alkyl-substituted dioxolane is selected from the group consisting of 4-methyl-1,3-dioxolane, and 2,2-dimethyl-1,3-dioxolane.

16. The cell of claim 13 wherein said dioxolane-based solvent is 1,3-dioxolane.

17. The cell of claim 13 wherein said dimethoxyethane-based solvent is selected from the group consisting of 1,1-dimethoxyethane, 1,2-dimethoxyethane, ethylglyme, diglyme, triglyme, and combinations thereof.

18. The cell of claim 13 wherein said dimethoxyethane-based solvent is 1,2-dimethoxyethane.

19. The cell of claim 13 wherein said cathode comprises manganese oxide and said electrolyte solvent system comprises alkyl-substituted dioxolanes.

20. The cell of claim 13 wherein said cathode comprises a member selected from the group consisting of iron sulfide, copper sulfide, and copper oxide, and said solute comprises lithium iodide.

21. The cell of claim 13 wherein said cathode comprises iron sulfide and said solute comprises a member selected from the group consisting of lithium iodide, lithium trifluoromethanesulfonate, lithium bistrifluoromethylsulfonyl imide, lithium perchlorate, lithium hexafluoroarsenate, and mixtures thereof.

22. The cell of claim 21 wherein said solute comprises lithium iodide and lithium trifluoromethanesulfonate.

23. The cell of claim 22 wherein said lithium iodide and said lithium trifluoromethanesulfonate are in a molar ratio of about 1:1.

24. An electrolyte solvent system for use in an electrochemical cell, said solvent system consisting of a dioxolane-based solvent and a dimethoxyethane-based solvent in a weight ratio of about 1:3, respectively.

* * * * *